Oct. 17, 1967 R. F. QUINTING 3,347,488
SEAT BELT RETRACTOR
Filed Nov. 12, 1965 2 Sheets-Sheet 1

INVENTOR.
Rudi F. Quinting
BY
Paul Fitzpatrick
ATTORNEY

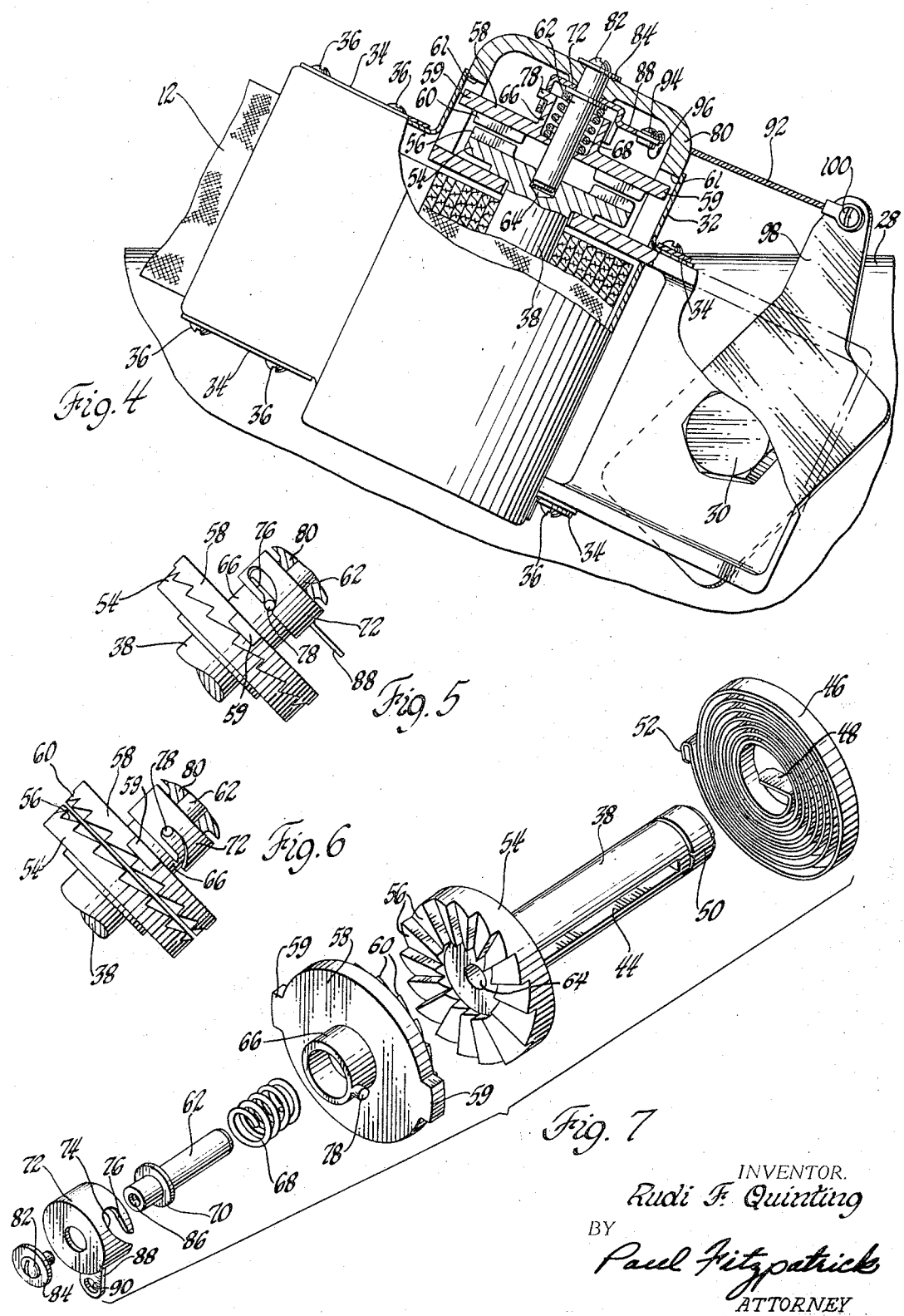

United States Patent Office 3,347,488
Patented Oct. 17, 1967

3,347,488
SEAT BELT RETRACTOR
Rudi F. Quinting, Clawson, Mich., assignor to General Motors Corporation, Detroit, Mich., a corporation of Delaware
Filed Nov. 12, 1965, Ser. No. 507,389
2 Claims. (Cl. 242—107.4)

ABSTRACT OF THE DISCLOSURE

A vehicle body is provided with a pair of belt straps which may be coupled together to form a continuous lap belt. One of the straps is anchored directly to the vehicle floor, while the other strap is connected to a retracting device which is in turn pivotally mounted to the floor. The retracting device includes a wind-up spring and has a plurality of reel-mounted ratchet teeth which are engageable with a ratchet wheel slidably mounted on the retractor housing. The ratchet wheel is spring biased into engagement with the reel teeth and includes a pin which is engageable with a cam member which is rotatable to slide the ratchet wheel out of engagement.

---

This invention relates in general to safety devices and more particularly to a safety reel device adapted for use with motor vehicle seat belt assemblies for automatically retracting the belt when not in use and for automatically locking the seat belt under predetermined conditions.

Basically, the purpose of a motor vehicle seat belt assembly is to restrain movement of the passenger in the event of a collision or sudden stopping of the vehicle. Conventionally, the assembly comprises a pair of belt straps which are secured to the vehicle on either side of the passenger seat and adapted to be fastened together around the passenger. Due to the various sizes of potential users, seat belts must be adjustable. Most seat belts provide for the adjustment to be accomplished at the buckle end with the common result of having an undesirable loose end when the seat belt is in place. Many reactor type devices which wind and store the belts when they are not in use have been proposed. These retractor devices necessitate complete unwinding to properly utilize the seat belt. Some retractors utilize a locking device which acts directly on the belt, thereby eventually resulting in a frayed belt.

It is, therefore, an object of the present invention to provide a seat belt retractor which is adjustable to the user and which incorporates a locking feature that does not fray the belt material.

Other objects, features and advantages of the subject invention will become apparent upon reference to the following detailed discussion and the drawings depicting the preferred embodiment of the invention, wherein:

FIGURE 4 is the same view as FIGURE 3 showing the locking apparatus disengaged;

FIGURE 5 is a sectional view of the ratchet locking means in its engaged position taken in the direction of arrows 5—5 in FIGURE 2;

FIGURE 6 is the same view as FIGURE 5 showing the ratchet locking means in its disengaged position; and FIGURE 7 is a perspective assembly view of the component parts of a retractor and locking means.

Figure 1:
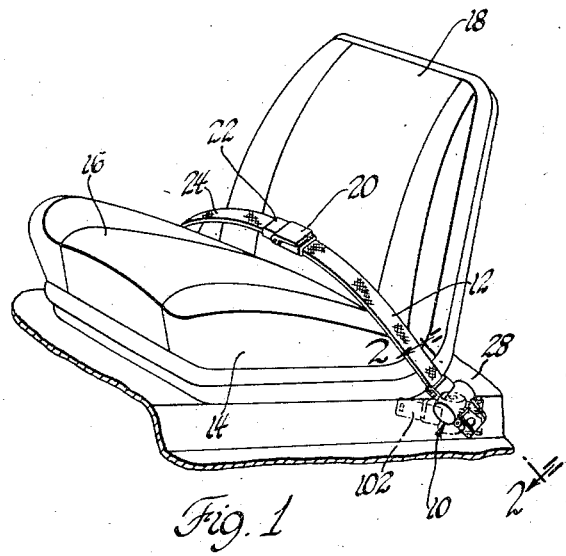
FIGURE 1 is a perspective view of an embodiment of the invention where it is used in conjunction with a vehicle seat.

More particularly, FIGURE 1 shows the subject seat belt retractor assembly 10 as applied to a seat belt 12 as used in securing a passenger (not shown) to a vehicle seat 14. The vehicle seat 14 may be of any suitable type having a base cushion 16 and a substantially vertical back cushion 18. The seat belt 12 extends from the retractor assembly 10 to a buckle 20 which engages a lock plate 22 secured by a belt 24 to a fixed anchorage (not shown) on the opposite side of the seat 14.

Figure 2:
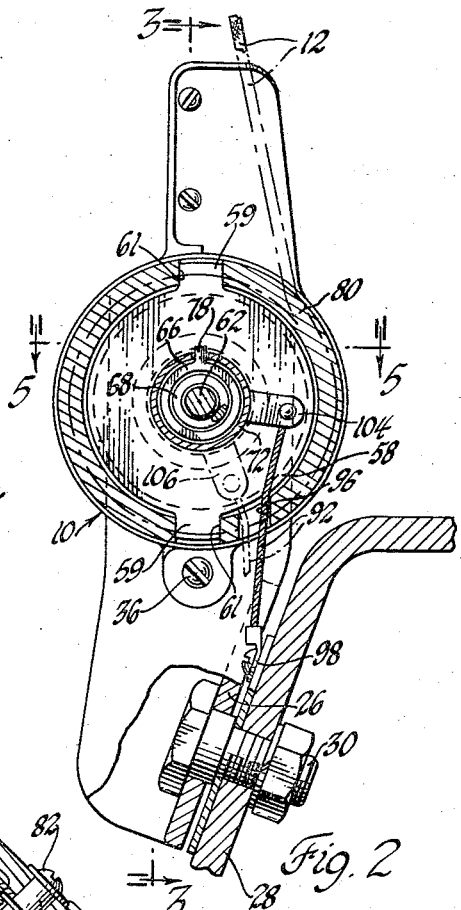
FIGURE 2 is an end view with parts broken away in section taken in the direction of arrows 2—2 in FIGURE 1.
Figure 3:
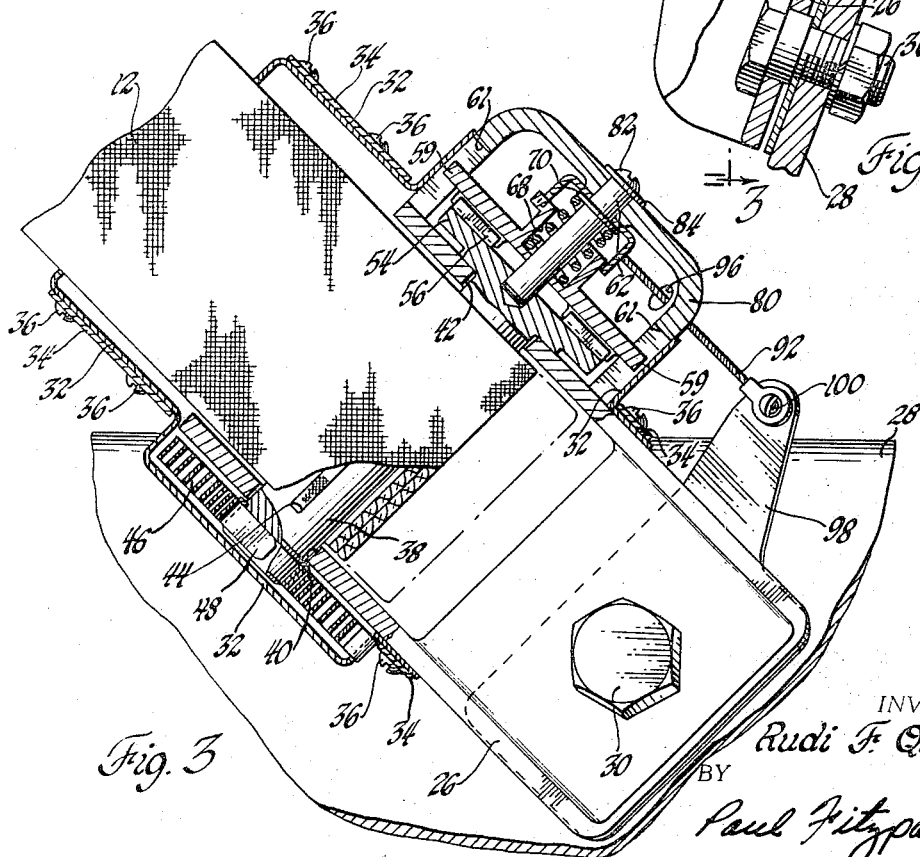
FIGURE 3 is a side view with parts broken away in section taken in the direction of arrows 3—3 in FIGURE 2.

The retractor assembly 10 is seen in FIGURES 2 through 4 to include a substantially U-shaped bracket 26 which is secured to the floor pan 28 of the vehicle by a bolted assembly 30. Mounted to the U-shaped bracket 26 and surrounding the remainder of the retractor assembly 10 are a pair of cover elements 32 and 34 which are held together by means of screws 36.

A retractor reel 38 is mounted across the U-shaped bracket 26 and resides in openings 40 and 42 therein. This reel 38 has a diametrical slot 44 cut therethrough to receive the end of the seat belt 12 and is adapted to rotate to thereby allow the seat belt 12 to be wound thereon. A clock spring 46 is mounted on the reel 38 externally of the U-shaped bracket 26. The internal end 48 of the clock spring 46 is adapted to be secured within a groove 50 in the end of the shaft 38. The external end 52 of the clock spring 46 is adapted to be secured to the wall of one of the cover members 32 or 34. This clock spring 46 opposes rotation of the reel 38 in one direction and encourages rotation of the reel 38 in the other direction. In this instance it is mounted so that it opposes rotation of the reel when the belt is being unwound from the reel and encourages rotation of the reel when the belt is being wound on the reel, to thereby serve as a retracting device for the belt.

The reel 38 terminates in a ratchet wheel 54 at its end opposite the spring 46. The ratchet wheel 54 has a plurality of teeth 56 on its external surface. Positioned coaxially with and adjacent to the ratchet wheel 54 is a second ratchet wheel 58 having a plurality of teeth 60 which are adapted to match and engage with the teeth 56 on the ratchet wheel 54. The ratchet wheel 58 has a pair of extensions 59 which, as will be explained, are used to lock the wheel against rotation. A small cylindrical rod 62 extends through the center of the ratchet wheel 58 and terminates in a bore 64 in the ratchet wheel 54. This cylindrical rod 62 positions the ratchet wheel 58 adjacent to the ratchet wheel 54. The ratchet wheel 58 has a hollow cylindrical flange 66 formed on its opposite side. A second spring 68 is mounted on the cylindrical rod 62 within the cavity formed by the flange 66 on the ratchet wheel 58. The spring 68 mounts between the ratchet wheel 58 and a peripheral flange 70 on the cylindrical rod 62. A locking cap 72 is also mounted on the cylindrical rod 62 and fits over the cylindrical flange 66 on the ratchet wheel 58. The locking cap 72 has a curved slot 74 therein which forms a cam surface 76 for a pin 78 which extends from the cylindrical flange 66 on the ratchet wheel 58. An end cover 80 fits over the end of the cylindrical rod 62 and fits within the cover members 34 and 36, thereby mounting the outer end of the rod 62. The cover 80 has slots 61 which receive extensions 59 on the ratchet wheel 58 to thereby lock the wheel 58 against rotation while allowing a desired amount of lateral movement. A suitable bolt 82 and a washer 84 are used to form a threaded assembly with an internal threaded bore 86 within the rod 62 to thereby secure the cap member 80 on the rod 62 and hold the assembly together. The locking cap 72 has a tab portion 88 extending therefrom with a hole 90 therethrough. A cable 92 is attached at one end to the tab 88 by means of a suitable bolted assembly 94 and extends through an aperture 96 in the cable member 80. The cable 92 is secured at its opposite end to a stationary bracket 98 by means of a bolted assembly 100. The bracket 98 is welded to the floor pan 28 and positioned adjacent to the bracket 26 by means of the bolted assembly 30.

The procedure for withdrawal and retraction of the seat belt assembly is as follows:

It should be noted first that the matching ratchet teeth 56 and 60 are formed so that they lock positively in only one direction of rotation and can slip relative to each other in the other direction of rotation. Initially, the retractor assembly will be in the locked position as shown in FIGURE 3. In order to withdraw the belt from the retractor the user must reach down and pull the cable so as to rotate the tab 88 on the locking cap 72 from the position shown in solid lines 104 to the position shown in dashed lines 106 in FIGURE 2. This rotation of the cap 72 causes the pin 78 to move along the cam surface 76 thereby withdrawing the ratchet wheel 58 from the teeth of the wheel 54. The reel 38 is then free to be rotated and the belt 12 can be withdrawn until the buckle 20 can be fastened to the lock plate 22. Once the seat belt assembly is securely in position around the user the cable 92 is released by the user thereby allowing the spring 68 to force the ratchet wheel 58 back into meshing contact with the wheel 54. At this point the meshing teeth 56 and 60 positively lock the reel 38 and prevent the belt from any further extension. This positive lock then prevents any movement of the user upon impact or other deceleration of the vehicle. It should be noted further that the spring 68 is sufficiently stronger than the clock spring 46 so as to effectively keep the teeth 56 and 60 in tight meshing contact thereby keeping them from slipping relative to each other in the retracting direction under the influence of the clock spring 46. This action then isolates the user from the retraction pull of the clock spring 46 while wearing the seat belt assembly.

Disassembly and retraction can be accomplished in either of two ways. First, the user must disconnect the buckle 20 and the lock plate 22. Then he can reach down and pull the cable 92 as before thereby unlocking and separating the ratchet wheels 54 and 58 and allowing the clock spring 46 to rotate the reel 38 and retract the belt 12. Once the belt 12 is fully retracted, the cable 92 is released thereby allowing the spring 68 to force the ratchet wheels into locking engagement again. An alternate method of actuating the retractor is to lower the belt to the position shown in dashed lines 102 in FIGURE 1. This lowering of the belt 12 rotates the retractor assembly about the bolted assembly 30 to the position shown in FIGURE 4. This rotation of the retractor assembly has the same effect as pulling the cable 92 as the pin 78 is constrained to follow the cam 76 thereby pulling the ratchet wheels 54 and 58 out of engagement and allowing the clock spring 46 to rotate the reel 38 and retract the belt 12. Once the belt 12 is fully retracted and the buckle 20 released by the user the spring 68 rotates the locking cap 72 thereby withdrawing the pin 78 from the cam 76 and forcing the ratchet wheels 54 and 58 into locking engagement again.

Therefore, it can be seen that the described embodiment of the subject invention provides a retractor for seat belt assemblies which has a self-locking feature. It can further be seen that this locking feature can be released by the user by merely tilting the retractor assembly or pulling the cable until the retraction of the belt has taken place. It can be seen further that the retractor assembly has a self-actuating feature wherein the locking mechanism returns to its locked position once the belt has been fully retracted and the assembly or the cable released by the user. It should be clear that this locking mechanism works regardless of the length of belt pulled from the retractor, thereby being automatically adjustable for users of various sizes. It further should be clear that this retractor assembly both locks the belt against further extension and isolates the user from the nuisance of the retraction force of the clock spring. Therefore, this retractor assembly overcomes the problems of adjustment, storage, and belt weakness due to fraying associated with prior seat belt assemblies.

Although but one embodiment of this invention has been described in detail, it should be clear to those skilled in the art to which it pertains that many changes and modifications may be made thereto without departing from the scope of the invention.

I claim:

1. In combination with a vehicle body having a safety belt, a retractor for the belt comprising a housing, means pivotally mounting the housing on the vehicle body, a reel rotatably mounted in the housing and having one end of the belt secured thereto, spring means mounted in the housing and urging the reel to rotate in one direction to wind the belt thereon, rotation of the reel in the other direction opposing the spring means and effecting unwinding of the belt from the reel, a ratchet member mounted on the reel, a second ratchet member nonrotatably and slidably mounted on the housing for movement between a first position fully engaging the first ratchet member and a second position disengaging the first ratchet member, the second ratchet member in first position preventing rotation of the reel in the said other direction to unwind the belt therefrom and normally permitting the spring means to urge the reel to rotate in the said one direction to wind the belt thereon, second spring means normally urging the second ratchet member into the first position with sufficient force to prevent the first spring means from urging the reel in the said one direction, selectively actuatable means mounted on the housing for selectively moving the second ratchet member to the second position against the force of the second spring means, and control means interconnecting the vehicle body and the selectively actuable means and operable upon pivotal movement of the housing to cause the selectively actuatable means to move the second ratchet member to the second position, thus enabling the first spring means to rotate the reel in the said one direction to wind the belt thereon.

2. The combination of claim 1, wherein the second ratchet member includes a pin and the selectively actuatable means include a cam member nonslidably mounted on the housing and rotatable to engage the pin and move the second ratchet member to the second position against the force of the second spring means.

References Cited

UNITED STATES PATENTS

| | | | |
|---|---|---|---|
| 2,706,603 | 4/1955 | Miller | 242—107.4 |
| 3,021,091 | 2/1962 | Swanson | 242—107.4 X |
| 3,248,149 | 4/1966 | Carter | 242—107.4 X |

FRANK J. COHEN, *Primary Examiner.*

WILLIAM S. BURDEN, *Assistant Examiner.*